(12) United States Patent
Sasser et al.

(10) Patent No.: US 7,410,307 B2
(45) Date of Patent: Aug. 12, 2008

(54) MODULAR OPTICAL DEVICE PACKAGE COMPATIBLE WITH MULTIPLE FIBER CONNECTORS

(75) Inventors: Gary Sasser, San Jose, CA (US); Chris K. Togami, San Jose, CA (US); Peter E. Campbell, Tiburon, CA (US)

(73) Assignee: Finisar Corporation, Sunnyvale, CA (US)

( * ) Notice: Subject to any disclaimer, the term of this patent is extended or adjusted under 35 U.S.C. 154(b) by 611 days.

(21) Appl. No.: 11/146,432

(22) Filed: Jun. 6, 2005

(65) Prior Publication Data
US 2005/0286901 A1 Dec. 29, 2005

Related U.S. Application Data

(60) Provisional application No. 60/576,932, filed on Jun. 4, 2004.

(51) Int. Cl.
*G02B 6/36* (2006.01)
*H04B 10/00* (2006.01)

(52) U.S. Cl. .............................. 385/93; 385/92; 385/88; 385/89; 398/135

(58) Field of Classification Search ................. 385/92, 385/93, 94, 88, 89, 53, 60, 64, 70, 71, 74, 385/76, 77, 61, 139; 398/135
See application file for complete search history.

(56) References Cited

U.S. PATENT DOCUMENTS

| 6,913,400 B2 * | 7/2005 | O'Toole et al. ................ 385/89 |
| 7,264,408 B2 * | 9/2007 | Togami et al. ................ 385/92 |
| 7,284,916 B2 * | 10/2007 | Sasser et al. ................... 385/92 |
| 7,334,948 B2 * | 2/2008 | Sasser et al. ................... 385/92 |
| 2003/0138219 A1 * | 7/2003 | O'Toole et al. ................ 385/92 |
| 2005/0286901 A1 * | 12/2005 | Sasser et al. ................. 398/135 |
| 2005/0286906 A1 * | 12/2005 | Togami et al. ............... 398/164 |

* cited by examiner

*Primary Examiner*—Brian M Healy
(74) *Attorney, Agent, or Firm*—Workman Nydegger

(57) ABSTRACT

Embodiments of the present invention are directed to modular optical devices compatible with multiple fiber connectors. A lens block is configured such that one or more lens pins can mechanically couple to the lens block and such that the lens block can mechanically couple to a fabricated package that includes light transmitting and/or detecting components. At least one lens pin has a fiber stop configured to accept a fiber end prepared for use with a first type of fiber connector. A fiber stop disk alters the configuration of the lens pin such that the lens pin can compatibly accept a fiber end prepared for use with a second different type of fiber connector not withstanding that the fiber stop is configured to accept a fiber end prepared for use with the first type of fiber connector.

25 Claims, 2 Drawing Sheets

MODULAR OPTICAL DEVICE PACKAGE COMPATIBLE WITH MULTIPLE FIBER CONNECTORS

CROSS-REFERENCE TO RELATED APPLICATIONS

The present invention claims priority to U.S. Provisional Patent Application Ser. No. 60/576,932, entitled "Modular Optical Device Package Compatible With Multiple Fiber Connectors", filed on Jun. 4, 2004, the entire contents of which are incorporated herein by reference.

BACKGROUND OF THE INVENTION

1. The Field of the Invention

The present invention is generally related to optical devices used in fiber optic communications systems. More particularly, the present invention provides for compact low cost modular optical devices compatible with multiple fiber connectors.

2. The Relevant Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. Generally, such optical transceivers implement both data signal transmission and reception capabilities. For example, a transmitter portion of a transceiver is configured to convert an incoming electrical data signal into an optical data signal and a receiver portion of the transceiver is configured to convert an incoming optical data signal into an electrical data signal.

More particularly, an optical transceiver at the transmission node receives an electrical data signal from a network device, such as a computer, and converts the electrical data signal to a modulated optical data signal using an optical transmitter such as a laser. The optical data signal can then be transmitted in a fiber optic cable via the optical communications network to a reception node of the network. At the reception node, the optical data signal is received at another optical transceiver that uses a photodetector, such as a photodiode, to convert the received optical data signal back into an electrical data signal. The electrical data signal is then forwarded to a host device, such as a computer, for processing.

Generally, multiple components are designed to accomplish different aspects of these functions. For example, an optical transceiver can include one or more optical subassemblies ("OSA") such as a transmit optical subassembly ("TOSA"), and a receive optical subassembly ("ROSA"). Typically, each OSA is created as a separate physical entity, such as a hermetically sealed cylinder that includes one or more optical sending or receiving components, as well as electrical circuitry for handling and converting between optical and electrical signals. Within the optical transceiver, each OSA generally includes electrical connections to various additional components such as a transceiver substrate, sometimes embodied in the form of a printed circuit board ("PCB"). OSAs in a conventional transceiver are generally oriented such that a longitudinal axis defined by the OSA is substantially parallel to the transceiver substrate. The transceiver substrate, in turn, is mounted to the board of a host bus adapter ("HBA") or other component.

The transceiver substrate can include multiple other active circuitry components particularly designed to drive or handle electrical signals sent to or returning from one or more of the OSAs. Accordingly, such a transceiver substrate will usually include a number of electrical transmission lines with the one or more OSAs. Such connections may include "send" and "receive" data transmission lines for each OSA, one or more power transmission lines for each OSA, and one or more diagnostic data transmission lines for each OSA. These transmission lines are connected between the transceiver substrate and the OSA using different types of electrical connectors, examples of which include an electrical flex circuit, a direct mounting connection between conductive metallic pins extending from the OSA and solder points on the PCB, and a plug connection that extends from the PCB and mounts into electrical extensions from an OSA.

As part of ongoing efforts to uniformly reduce the size of optical transceivers and other components, manufacturing standards such as the small form factor ("SFF"), small form factor pluggable ("SFP"), and 10 gigabit small form factor pluggable ("XFP") standards have been developed. Nonetheless, the size of most optical transceivers, even those that comply with such manufacturing standards, best suits them for external connections to a computer system, such as a desktop computer, a laptop computer, or a handheld digital device.

For example, an SFF or SFP optical transceiver can be used to provide an interface between an optical cable and a standard network cable, such as an Ethernet cable for example, that plugs into a computer system. Alternatively, a number of optical transceivers can be mounted in a network panel and configured to include an external connection to a computer system. However, the number of components within a conventional transceiver, as well as the orientation and the size of SFF or SFP optical transceivers, makes it difficult, if not impossible, to integrate conventional optical transceivers into smaller spaces, such as within a pluggable card for use in a laptop computer or hand held device. For example, despite their relatively compact nature, conventional SFF, SFP, and XFP optical transceiver bodies are still too wide and/or tall to fit within a typical PCMCIA laptop envelope.

A related problem concerns the connections of the optical transceiver. In particular, use of the optical transceiver as an external, rather than internal, component necessitates the use of additional connectors and connections, which increase both the overall cost associated with the system as well as the complexity of the system. As well, optical transceivers employed in an external, rather than integrated, configuration are more prone to rough handling and damage than an integrated component.

Furthermore, even if the conventional optical transceiver could fit within such an envelope, the length of the conventional SFF, SFP, or XFP optical transceiver is such that the transceiver substrate takes up an inordinate amount of board space on a corresponding host bus adapter ("HBA") or other component to which the optical transceiver is attached. This problem is of particular concern in light of the concurrent demands for increases in functionality and decreases in component size. These, and other, considerations make conventional optical transceivers less than ideal for integration within many computer systems.

Additionally, optical transceivers are often designed for compatibility with a single type of fiber. A fiber optical cable typically interfaces with an optical transceiver through a lens pin that receives the fiber optical cable. Due to lens pin configurations, it is often not appropriate to use different types of fibers with different transceivers. For example, MU fibers frequently include a sharp chamfer at the fiber tip and typically cannot be used with LC configured lens pins. Accordingly, what would be advantageous are reduced cost optical transceivers that can fit within relatively small envelopes such that the optical transceivers are compatible with different types of fibers.

BRIEF SUMMARY OF THE INVENTION

The foregoing problems with the prior state of the art are overcome by the principles of the present invention, which are directed to modular optical devices compatible with multiple fiber connectors. A lens block is configured such that one or more lens pins can mechanically couple to the lens block and such that the lens block can mechanically couple to a fabricated package. A fabricated package, including a light source and/or light detector and including a connection portion for electrically coupling the fabricated package to a substrate, is mechanically coupled to the lens block. A lens pin, for transferring an optical signal between the at least one of the light source and light detector and a corresponding external component, is mechanically coupled to the lens block. The lens pin has a fiber stop configured to accept a fiber end prepared for use with a first type of fiber connector (e.g., an LC connector). A fiber stop disk is in mechanical contact with the lens pin and covers the fiber stop. The fiber stop disk alters the configuration of the lens pin such that the lens pin can compatibly accept a fiber end prepared for use with a second different type of fiber connector (e.g., an MU connector) not withstanding that the fiber stop is configured to accept a fiber end prepared for use with the first type of fiber connector (e.g., the LC connector).

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
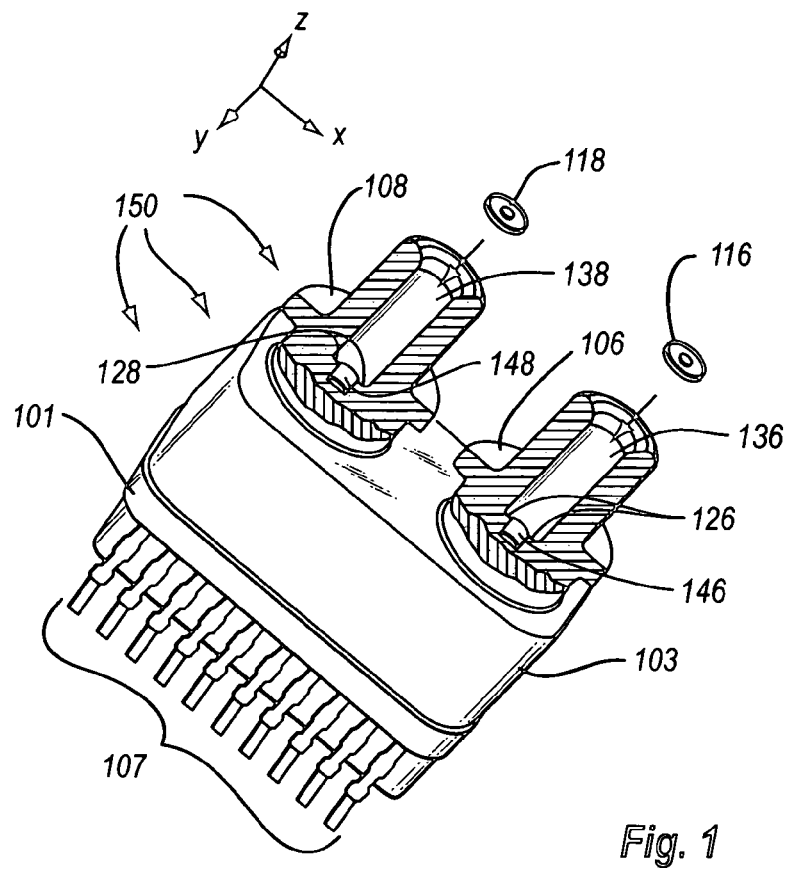
FIG. 1 illustrates a partial cut-away view of components of an example modular optical device relative to fiber stop disks.

The principles of the present invention relate to modular optical devices compatible with multiple fiber connectors. A lens block is configured such that one or more lens pins can mechanically couple to the lens block and such that the lens block can mechanically couple to a fabricated package. A fabricated package, including a light source and/or light detector and including a connection portion for electrically coupling the fabricated package to a substrate, is mechanically coupled to the lens block. A lens pin, for transferring an optical signal between the at least one of the light source and light detector and a corresponding external component, is mechanically coupled to the lens block. The lens pin has a fiber stop configured to accept a fiber end prepared for use with a first type of fiber connector (e.g., an LC connector). A fiber stop disk is in mechanical contact with the lens pin and covers the fiber stop. The fiber stop disk alters the configuration of the lens pin such that the lens pin can compatibly accept a fiber end prepared for use with a second different type of fiber connector (e.g., an MU connector) not withstanding that the fiber stop is configured to accept a fiber end prepared for use with the first type of fiber connector (e.g., the LC connector). The modular optical device can be coupled to a substrate configured to be received within a standard slot of a host device or system, such as a PCI or PCMCIA slot.

In general, embodiments of the present invention describe modular optical devices (e.g., TOSAs and ROSAs) that can be integrated within the relatively small physical envelopes defined by compact components, such as a Host Bus Adapter ("HBA"). Embodiments of the present invention can interoperate with a desktop computer, a laptop computer, or other similar computer system, while maintaining compliance with applicable operational and performance standards.

As used herein, "OSA" refers to any one of a transmit optical subassembly ("TOSA") or a receive optical subassembly ("ROSA"). Further, a "substrate" refers to a printed circuit board ("PCB") having electrically conductive elements such as circuit traces for transmitting power and/or communication signals between components in a modular optical device and another system or device, such as a computer system. A transceiver PCB can include circuits, devices and systems for facilitating the operation and control of the modular optical device. Such circuits, devices and systems include, but are not limited to, a laser driver, a post amplifier, and transimpedance amplifier.

Embodiments of the present invention include a lens block that is configured such that one or more lens pins can mechanically couple to the lens block and such that the lens block can mechanically couple to a fabricated package. Lens pins can include fiber stops and can receive fiber stop disks such that the lens pins can compatibly receive a plurality of different types of fiber connectors. Accordingly, a modular optical device can include a lens block, a fabricated package, one or more lens pins, and one or more fiber stop disks.

The fabricated package can include a light source, such as, for example, a laser (e.g., a vertical cavity surface emitting laser ("VCSEL")) and/or light detector (e.g., photodiode) as well as corresponding openings for transmitting and receiving optical signals. The fabricated package can also include a lead frame (e.g., in thru hole pin or formed lead configuration)

for connecting (e.g., utilizing corresponding thru holes or surface mounting) the fabricated package to a Printed Circuit Board Assembly ("PCBA"), such as, for example, a Host Bus Adapter ("HBA"). Alternately, the fabricated package can include a flex circuit for connecting to a PCBA. Thus, active and/or passive circuitry components for driving the light source (e.g., a laser driver), converting a received light signal (e.g., transimpedance amplifier), or for implementing other optical signal processing can be designed into the PCBA.

Configurations of the lens block can include receptacles for accepting one or more lens pins. For example, a transmission lens pin, a reception lens pin, or a combination of transmission lens pins and/or reception lens pins can be mechanically coupled to the lens block. Lens pins mechanically coupled to the lens block can provide appropriate receptacles for receiving external optical connections. Lens pins can include lenses that focus optical signals. Lens pins can include a fiber stop and can receive a fiber stop disk that facilitates the lens pins compatibly receiving a plurality of different types of fiber connectors. Fiber stop disks can be made of metal, plastic, or other appropriate materials.

Accordingly, a lens pin can direct a generated optical signal from the lens block to an external component (e.g., one of a plurality of different optical cables) or can direct a received optical signal from an external component to the lens block. For example, an optical signal generated at a laser in the fabricated package can be transferred through a corresponding lens in the lens block, transferred through a corresponding lens pin, to a corresponding optical cable. Likewise, an optical signal received from an optical cable can be transferred through a corresponding lens pin, transferred through a corresponding lens in the lens block, into a corresponding photodiode in the fabricated package.

Referring now to FIG. 1, FIG. 1 illustrates a partial cut-away view of components of an example modular optical device 150 relative to fiber stop disks 118 and 116. Generally, components similar to those in FIG. 1 can be used in modular optical devices of various form factors, including, but not limited to, an SFF, SFP, and XFP optical transceiver. The foregoing is exemplary however, and modular optical devices can be implemented in various other forms as well. Further, embodiments of the invention are suitable for use in connection with a variety of data rates such as about 1 Gbps, about 2 Gbps, about 4 Gbps, and about 10 Gbps, or higher.

FIG. 1 depicts lens pins 106 and 108, lens block 103, and fabricated package 101, which have been mechanically coupled to one another to form modular optical device 150. Generally, fabricated packages, lens blocks, and lens pins can be fabricated (e.g., molded, machined, cast, etc.) from plastic, metal, or any other suitable material. Fabricated package 101 can include a transmission opening (e.g., opening 141 in FIG. 2) for transmitting generated optical signals. For example, VCSEL 151 (Vertical Cavity Surface Emitting Laser) can transmit optical signals out of transmission opening 141. Fabricated package 101 can also include a detector opening (e.g., opening 142 in FIG. 2) for detecting received optical signals. For example, photodiode 152 can detect optical signals received at detector opening 142.

Fabricated package 101 also includes a formed lead frame 107 for connecting fabricated package 101 (both electrically and mechanically) to a Printed Circuit Board Assembly ("PCBA"), such as, for example, a Host Bus Adapter ("HBA"). For example, formed lead frame 107 can be used to surface mount fabricated package 101 to a PCBA. Other types of external connectors can also be used.

Lens pins 106 and 108 can be slip fit into corresponding receptacles of lens block 103 to facilitate transferring optical signals between fabricated package 101 and corresponding external components (e.g., single-mode or multi-mode fiber). Lens block 103 can be fit onto (e.g., placed flush against) fabricated package 101. Lens block 103 and fabricated package 101 can be held together using a variety of attachment means, such as, for example, epoxy, metal clips, or laser welding. Laser welding can be particularly advantageous when lens block 103 and fabricated package 101 are made of similar plastic compounds. Lens pins (e.g., lens pins 108 and 106) can be held to lens block 103 using similar means.

Lens pins 106 and 108 include fiber stops 126 and 128 respectively. Fiber stops 126 and 128 are configured to compatibly accept less chamfered fiber ends (e.g., fiber ends prepared for use with LC connectors or "LC fiber ends"). That is, fiber stops 126 and 128 prevent LC fiber ends from significantly protruding into either of cylindrical cavities 146 and 148 respectively.

Fiber stop disks can be used to alter the configuration of lens pins such that more chamfered fiber ends (e.g., fiber ends prepared for use with MU connectors or "MU fiber ends") can be compatibly accepted into the lens pins not withstanding that corresponding fiber stops are configured to compatibly accept less chamfered fiber ends (e.g., LC fiber ends). For example, fiber stop disk 118 can be inserted into cylindrical cavity 138 and held in mechanical contact with the inside of lens pin 108 at fiber stop 128. Similarly, fiber stop disk 116 can be inserted into cylindrical cavity 136 and held in mechanical contact with the inside of lens pin 106 at fiber stop 126.

Figure 2:
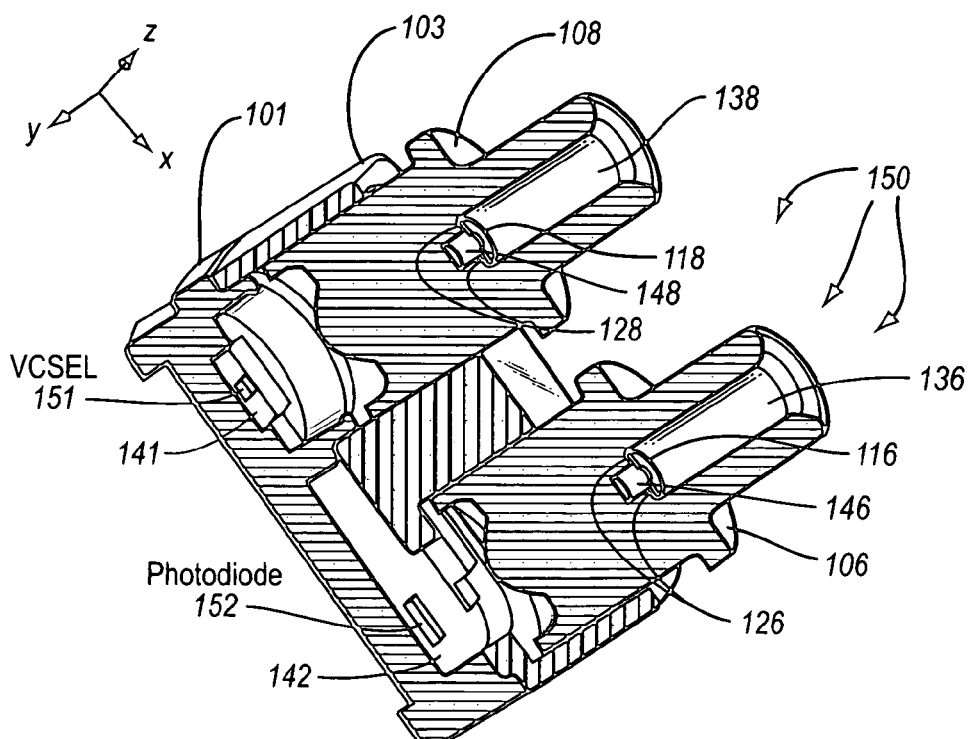
FIG. 2 illustrates a cut-away perspective view of components of an example modular optical device including fiber stop disks.

FIG. 2 illustrates a cut-away perspective view of components of example modular optical device 150 including fiber stop disks 118 and 116. The configuration in FIG. 2 can facilitate lens pins 106 and 108 compatibly accepting more chamfered fiber ends (e.g., MU fiber ends) not withstanding that fiber stops 126 and 128 are configured to compatibly accept less chamfered fiber ends (e.g., LC fiber ends). That is, fiber stop disks 116 and 118 prevent the more chamfered fiber ends from protruding significantly into cylindrical cavities 146 and 148 respectively. To receive MU fiber ends fiber stop disks can be pressed into place at lens pins 106 and/or 108. Fiber stop disks can be made by a simple, inexpensive stamping process. Fiber stop disks 116 and 118 advantageously promote appropriate alignment of MU fiber ends along the Z-axis mitigating any potential drop in performance.

Thus, light signals emitted at opening 141 can be transferred through lens block 103 and lens pin 108 to an MU fiber end. Likewise, light signals received from an MU fiber end can be transferred through lens pin 106 and lens block 103 and received at opening 142.

Figure 3A:
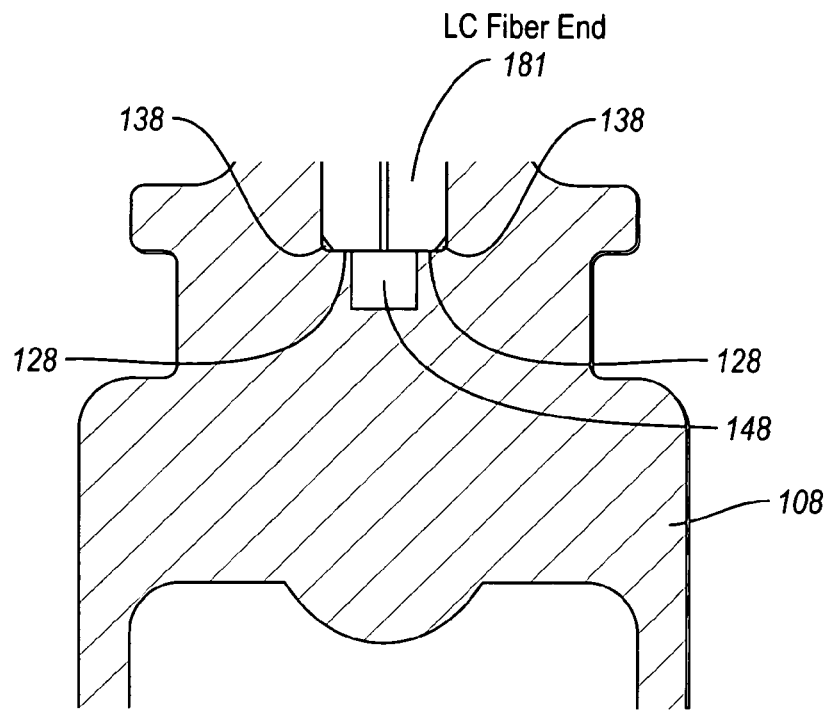
FIG. 3A illustrates an enlarged cut-away view of a lens pin, the lens pin having a fiber stop configured to receive a fiber end prepared for use with an LC connector.

FIG. 3A illustrates an enlarged cut-away view of lens pin 108 configured to receive an LC fiber end 181. As depicted, the diameter of LC fiber end 181 is greater than the diameter of cylindrical cavity 148. Thus, LC fiber end 181 stops at fiber stop 128 and does not protrude significantly (or at all) into cylindrical cavity 148.

Figure 3B:
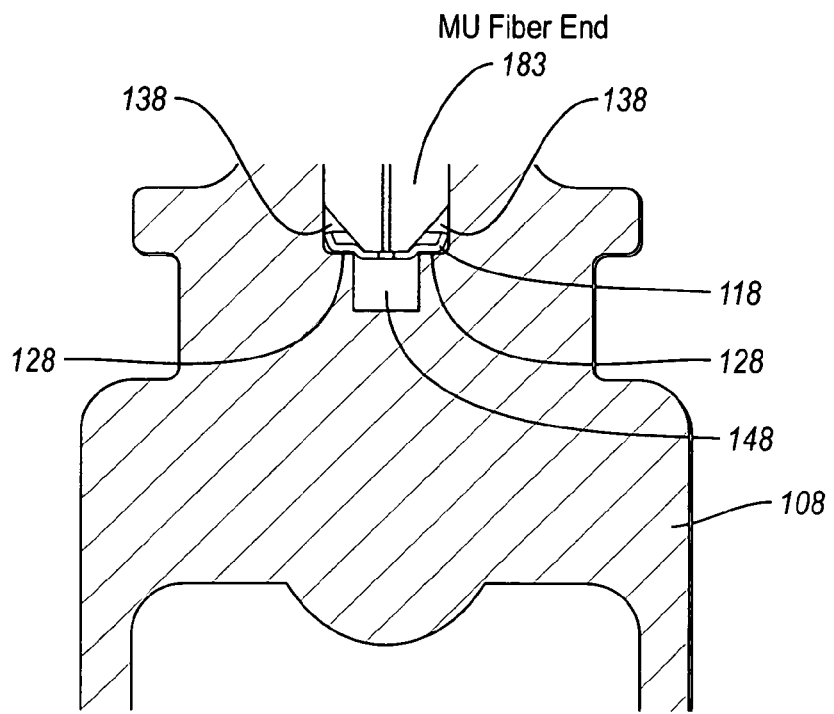
FIG. 3B illustrates an enlarged cut-away view of the lens pin of FIG. 3 wherein a fiber stop disk alters the configuration of the lens pin such that the lens pin can compatibly receive a fiber prepared for use with an MU connector.

FIG. 3B illustrates an enlarged cut-away view of the lens pin 108 configured to receive an MU fiber end 183. As depicted, the diameter of the tip of MU fiber end 183 is smaller than the diameter of cylindrical cavity 148. However, MU fiber end 183 stops at fiber stop disk 118 and does not protrude significantly (or at all) into cylindrical cavity 148. Thus, fiber stop disks can be used to alter lens pins to compatibly accept MU fiber ends notwithstanding that fiber stops contained in the lens pins are configured to accept LC fiber ends.

Modular optical device 150 can be positioned and mounted (e.g., by connecting lead frame 107) on a substrate, such as, for example, a host bus adapter. Lead frame 107 can facilitate electrical communication between circuitry (not shown) on the substrate (or other components to which modular optical device 150 is mounted) and fabricated package 101. Accordingly, lead frame 107 enables data transmission and/or reception, as well as the transmission and reception of control and monitoring signals, between fabricated package 101 and a substrate. Electrical communication can include communication between a light source included in fabricated package 101, such as, for example, VCSEL 151 and a corresponding laser driver circuit on the substrate. Likewise, electrical communication can include communication between a light detector included in fabricated package 101, such as, for example, photodiode 152, and a corresponding transimpedance amplifier circuit on the substrate. Lead frame 107 can be connected to a substrate in a variety of ways, including, but not limited to, surface mount connectors, thru hole connectors, and compression-type connectors.

Components (now shown), such as, for example, light emitting diodes, a laser driver, a post amplifier, a transimpedance amplifier, a current bias driver, volatile and/or non-volatile memory, and a thermo-electric cooler ("TEC") can be implemented on either side of a substrate as appropriate. Implemented components can interface electrically with modular optical device 150 through lead frame 107. Likewise, when the substrate is coupled to a computer system or other device, such implemented components can interface electrically with the computer system or other device. Mounting components, circuits and devices on both sides of a substrate can facilitate a compact structure without any meaningful loss in functionality. Moreover, as previously described, this aids space conservation on an HBA or other device to which the modular optical device 150 is mounted.

Further, including circuitry for interoperating with light sources and light detectors on the substrate (or other appropriate medium) reduces the circuitry that is to be included in fabricated package 101. Accordingly, the number and size of components included in fabricated package 101 is reduced resulting in a cheaper, more compact optical device. Additionally, the reduced size allows for production of relatively shorter transceivers that can be readily integrated within various devices Modular optical device 150 can be arranged such that the distance between lens pin 108 and lens pin 106 is large enough that a first optical connector can be connected to lens pin 108, while a second optical connector is simultaneously connected to lens pin 106 and vice versa. Generally, lens pins 106 and 108 can be configured to receive any of a variety of connectors, such as, for example, MU, SC, LC, ST, and FC connectors. In some embodiments, a lens pin is configured to compatibly receive two or more different types of connectors.

Generally, a HBA can be any type of printed circuit board implemented as a suitable connector interface for use with a computer system, wherein the connector interface may take the form of, for example, a peripheral component interconnect ("PCI") card having edge connectors configured and arranged to interface with a desktop computer system The connector interface may alternatively take the form of, for example, a printed circuit board with a serial or parallel port, or a Personal Computer Memory Card International Association ("PCMCIA") standard card. Note that as used herein, "connector interface" generally refers to a PCB or other device that acts as an interface between an optical component, such as the modular optical device 150, and a host system such as a laptop computer, desktop computer, or portable computing systems such as personal digital assistants ("PDA").

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A modular optical device, comprising:
    a lens block configured such that one or more lens pins can mechanically couple to the lens block and such that the lens block can mechanically couple to a fabricated package;
    a fabricated package mechanically coupled to the lens block, the fabricated package including at least one of a light source and light detector and including a connection portion for electrically coupling the fabricated package to a substrate;
    a lens pin mechanically coupled to the lens block, the lens pin having a fiber stop configured to accept a fiber end prepared for use with a first type of fiber connector, the lens pin for transferring an optical signal between the at least one of the light source and light detector and a corresponding external component; and
    a fiber stop disk in mechanical contact with the lens pin and covering the fiber stop, the fiber stop disk altering the configuration of the lens pin such that the lens pin can compatibly accept a fiber end prepared for use with a second different type of fiber connector not withstanding that the fiber stop is configured to receive a fiber end prepared for use with the first type of fiber connector.

2. The modular optical device as recited in claim 1, wherein the fabricated package includes a laser.

3. The modular optical device as recited in claim 2, wherein the fabricated package includes a vertical cavity surface emitting laser.

4. The modular optical device as recited in claim 1, wherein the fabricated package includes a photodiode.

5. The modular optical device as recited in claim 1, wherein the fabricated package includes a lead frame for connecting to a substrate.

6. The modular optical device as recited in claim 1, wherein the lens pin is configured to direct an optical signal between the light source and a corresponding optical cable.

7. The modular optical device as recited in claim 1, wherein the fiber stop disk covers the fiber stop such that the lens pin can compatibly receive a fiber end prepared for use with an MU connector notwithstanding that the fiber stop is configured to receive a fiber end prepared for use with an LC connector.

8. The modular optical device as recited in claim 1, wherein the fiber stop disk covers the fiber stop such that a fiber end prepared for use with an MU connector can appropriately align along a Z-axis.

9. The modular optical device as recited in claim 1, wherein the fiber stop disk is a metal disk.

10. An optoelectronic interface device, comprising:
    a host bus adapter having a printed circuit board with at least one connector for electrically interfacing with a host device; and
    a modular optical device configured to mechanically and electrically interface with the host bus adapter, the modular optical device comprising:

a lens block configured such that one or more lens pins can mechanically couple to the lens block and such that the lens block can mechanically couple to a fabricated package;

a fabricated package mechanically coupled to the lens block, the fabricated package including at least one of a light source and a light detector, the fabricated package including a connection portion for electrically coupling the fabricated package to the host bus adapter;

at least one lens pin mechanically coupled to the lens block, the at least one lens pin having a fiber stop configured to accept a fiber end prepared for use with a first type of fiber connector, the at least one lens pin for transferring an optical signal between the at least one of a light source and a light detector and an external component; and at least one fiber stop disk in mechanical contact with a corresponding at least one lens pin and covering at least one corresponding fiber stop, the at least one fiber stop disk altering the configuration of the at least one lens pin such that the at least one lens pin can compatibly accept a fiber end prepared for use with a second different type of fiber connector not withstanding that the fiber stop is otherwise configured to receive a fiber end prepared for use with the first type of fiber connector.

11. The optoelectronic interface device as recited in claim 10, wherein the host bus adapter includes components for converting between an optical signal and an electrical signal.

12. The optoelectronic interface device as recited in claim 11, wherein the host bus adapter includes a laser driver.

13. The optoelectronic interface device as recited in claim 11, wherein the host bus adapter includes a transimpedance amplifier.

14. The optoelectronic interface device as recited in claim 10, wherein the optoelectronic interface device is configured to be substantially received within a standard slot of the host device.

15. The modular optical device as recited in claim 10, wherein the at least one fiber stop disk covers the at least one fiber stop such that the at least one lens pin can compatibly receive a fiber end prepared for use with an MU connector notwithstanding that the at least one fiber stop is configured to receive a fiber end prepared for use with an LC connector.

16. The modular optical device as recited in claim 10, wherein the at least one fiber stop disk covers the at least one fiber stop such that a fiber end prepared for use with an MU connector can appropriately align along a Z-axis.

17. The modular optical device as recited in claim 10, wherein a fiber stop disk is a metal disk.

18. A modular optical device, comprising:

a lens block configured such that a plurality of lens pins can mechanically couple to the lens block and such that the lens block can mechanically couple to a fabricated package;

a fabricated package mechanically coupled to the lens block, the fabricated package including a laser and a photodiode, the fabricated package including a connector for electrically and mechanically coupling the fabricated package to a substrate such that the modular optical transceiver can interface with circuitry on the substrate;

a first lens pin mechanically coupled to the lens block for directing an optical signal from the laser to an external component, the first lens pin having a first fiber stop configured to accept a fiber end prepared for use with a first type of fiber connector;

a second lens pin mechanically coupled to the lens block for directing an optical signal from an external component to the photodiode, the second lens pin having a second fiber stop configured to accept a fiber end prepared for use with the first type of fiber connector;

a first fiber stop disk in mechanical contact with the first lens pin and covering the first fiber stop, the first fiber stop disk altering the configuration of the first lens pin such that the first lens pin can compatibly accept a fiber prepared for use with a second different type of fiber connector not withstanding that the first fiber stop is otherwise configured to accept a fiber end prepared for use with the first type of fiber connector; and a second fiber stop disk in mechanical contact with the second lens pin and covering the second fiber stop, the second fiber stop disk altering the configuration of the second lens pin such that the second lens pin can compatibly accept a fiber prepared for use with the second different type of fiber connector not withstanding that the second fiber stop is otherwise configured to accept a fiber end prepared for use with the first type of fiber connector.

19. The method as recited in claim 18, wherein the laser is a vertical cavity surface emitting laser.

20. The modular optical device as recited in claim 18, wherein the first fiber stop disk covers the first fiber stop such that the lens pin can compatibly receive a fiber end prepared for use with an MU connector not withstanding that the first fiber stop is configured to receive a fiber end prepared for use with an LC connector.

21. The modular optical device as recited in claim 18, wherein the first fiber stop disk covers the first fiber stop such that a fiber end prepared for use with an MU connector can appropriately align along a Z-axis when inserted into the first lens pin.

22. The modular optical device as recited in claim 18, wherein the first fiber stop disk is a metal disk.

23. The modular optical device as recited in claim 18, wherein the second fiber stop disk covers the second fiber stop such that the lens pin can compatibly receive a fiber end prepared for use with an MU connector not withstanding that the second fiber stop is configured to receive a fiber end prepared for use with an LC connector.

24. The modular optical device as recited in claim 18, wherein the second fiber stop disk covers the second fiber stop such that a fiber end prepared for use with an MU connector can appropriately align along a Z-axis when inserted into the second lens pin.

25. The modular optical device as recited in claim 18, wherein the second fiber stop disk is a metal disk.

* * * * *